United States Patent [19]
Carme et al.

[11] Patent Number: 5,744,700
[45] Date of Patent: Apr. 28, 1998

[54] DEVICE FOR DETECTING AND LOCATING FLUID LEAKS

[75] Inventors: Christian Carme; Virginie Delemotte, both of Marseille; Jean René Ardouin, Sanary; Alain Del Tatto, La Farlede, all of France

[73] Assignees: Technofirst, Aubagne Cedex; Gaz de France, La Plaine Saint Denis, both of France

[21] Appl. No.: 529,171

[22] Filed: Sep. 15, 1995

[51] Int. Cl.⁶ ............................................. G01M 3/24
[52] U.S. Cl. ............................................. 73/40.5 A
[58] Field of Search ..................... 73/40.5 A, 40.5 R, 73/592

[56]  References Cited

U.S. PATENT DOCUMENTS

| | | | |
|---|---|---|---|
| 3,170,152 | 2/1965 | Long | 73/40.5 A |
| 4,083,229 | 4/1978 | Anway | 73/592 X |
| 4,289,019 | 9/1981 | Claytor | 73/40.5 A |
| 4,309,576 | 1/1982 | Corrigan | 73/40.5 A X |
| 4,455,863 | 6/1984 | Huebler et al. | 73/40.5 A |
| 4,833,719 | 5/1989 | Carme et al. | 381/72 |

FOREIGN PATENT DOCUMENTS

| | | |
|---|---|---|
| 0583900 | 2/1994 | European Pat. Off. . |
| 2257088 | 1/1975 | France . |
| 0059137 | 4/1982 | Japan ............ 73/40.5 A |
| 0111036 | 6/1984 | Japan ............ 73/40.5 A |
| 80/01943 | 9/1980 | WIPO ............ 73/40.5 A |

OTHER PUBLICATIONS

Sabo, J.R., 'Detect buried steam leaks with acoustics' Electrical World, vol. 186, No. 1, 1 Jul. 1976, NY, USA, p. 40.

*Primary Examiner*—Michael Brock
*Attorney, Agent, or Firm*—Ladas & Parry

[57]  ABSTRACT

The present invention relates to a device for detecting and locating leaks of fluids circulating in a pipe system. The technical field of the invention is that of fluid leak detection devices. The device comprises a pick-up sensor not in contact with the pipe system, signal-processing means for processing the signals delivered by said pick-up sensor and headphones equipped with speakers supplied by said signal-processing means, said headphones further comprising a microphone connected to said signal-processing means, and said signal-processing means comprising electronic noise-reducing means.

12 Claims, 4 Drawing Sheets

5,744,700

DEVICE FOR DETECTING AND LOCATING FLUID LEAKS

FIELD OF THE INVENTION

The present invention relates to a device for detecting and locating fluid leaks in pipe systems which are, at least partly, buried underground.

BACKGROUND OF THE INVENTION

The technical field of the invention is that of fluid leak detection devices.

Patent Application FR 2 620 792 of IGET INTERNATIONAL describes a method for locating fluid leaks in underground pipe systems, consisting in sending out an acoustic signal into the liquid in one point of the pipe system and in picking up on the ground surface, the signal transmitted by the liquid and by the ground situated around the pipe, thus making it possible to locate the areas where the picked-up signal reaches a maximum value.

This document also describes a device for locating leaks, which device comprises emitting means for sending out an acoustic signal into the liquid in one point of the pipe system, receiving means comprising an acoustic sensor to which is associated a filtering circuit, for picking up the transmitted signal, which receiving means are movable on the surface of the ground above the pipe system and comprise means for analyzing the picked up signal; the signal from the acoustic sensor, being amplified, is applied to analyzing means, such as, for example, a voltmeter or headphones.

SUMMARY OF THE INVENTION

It is the object of the present invention to provide an improved device for detecting and locating fluid leaks in buried or non-buffed pipe systems.

Another object of the present invention is to enable an operator who is wearing headphones diffusing sound waves representing the picked-up and amplified signal, to readily identify and/or recognize the characteristic noise caused by the fluid leak.

One particular object of the present invention is to provide a device for locating leaks in buried pipe systems, which device is easier to use than the device described in the aforesaid patent application; indeed, the device described in said document, which requires sending out an acoustic signal into the liquid in a point of the pipe system such as a manhole or a storage tank, is very difficult if not impossible to use when the pipe system to be controlled has none of such accessory or else when such a pipe system accessory is very remote from the spot where the leak is located.

Yet another object of the present invention is to provide such a device for use in the case where the fluid flowing through the pipe system is at least partly in gaseous phase and is inflammable or combustible and/or toxic.

The solution to the raised problem consists in providing a device for detecting and locating leaks of fluids, particularly gaseous fluids, which are inflammable or toxic and circulate through pipe systems, such as pipe systems buried underground, which device comprises a pick-up sensor or transducer which is either an acoustic or a vibration pick-up sensor, not in contact with the pipe system, a signal-processing device for processing the signals delivered by said pick-up sensor, and headphones equipped with speakers supplied by said signal processing device, said headphones being further equipped with a microphone, hereinafter referred to as microphone for reducing ambient noise, which microphone is connected to said signal processing means, and in which said signal processing means comprise electronic means for reducing the ambient noise.

According to preferred embodiments of the invention:

said pick-up sensor is a microphone or an accelerometer;

the device comprises headphones equipped with two sound-insulated shells, each shell comprising said speaker and said noise-reducing microphone, both of which are connected to said signal processing means and said pick-up sensor is mounted on a support adapted to be sunk into a well dug in the ground;

the device comprises means for positioning said microphone in said well at a depth varying between $10^{-1}$ meter and 1 meter, and preferably between about $4 \times 10^{-1}$ and $5 \times 10^{-1}$ meters, as well as means for adjusting or varying said sinking depth of said microphone in said well;

the device comprises means, preferably passive insulating means, for insulating said pick-up sensor against sounds and vibrations;

said pick-up sensor is mounted on the lower end of a support such as a plunger tube which is adapted to slide inside a preferably tubular guide, surrounded by an insulating sleeve, so as to limit sound and/or vibration interference;

in the case where said pick-up sensor is constituted by a microphone, said guide is provided at its lower end with an acoustically transparent plate-shaped shutter;

the device comprises two pick-up sensors respectively fixed to two tubular supports adapted to be placed inside two respective wells dug in the ground; and the means for processing the signals delivered by said pick-up sensors comprise selector means, enabling transmission of the signals sent by either one of said pick-up sensors towards said signal processing means;

the device comprises inside a portable case:
  a selector for switching to a pick-up sensor selected from two pick-up sensors,
  a preamplifier for the signals delivered by either one of said pick-up sensors,
  a high-pass or bandpass filter enabling the filtering of the signals delivered by said preamplifier,
  display means for displaying the average level of the signals delivered by said high-pass or bandpass filter, such as for example, a galvanometer or a digital display,
  an adjustable amplifier, for amplifying the signals delivered by said high-pass or bandpass filter in order to obtain a variable pick-up level of said signals,
  a source of electric power such as a battery, for supplying said pick-up sensors, said signal processing means provided in said case and said speakers and microphones provided in said headphones;

said high-pass or bandpass filter has an attenuation gradient in the low frequencies at least equal to 6 decibels per octave and at most equal to 24 decibels per octave; the low cut-off frequency of said filter is higher than or equal to 100 hertz, and preferably between 200 and 400 hertz;

said high-pass or bandpass filter has an attenuation gradient in the high frequencies at least equal to 6 decibels per octave and at most equal to 24 decibels per octave; the high cut-off frequency of said filter is less than or equal to 2000 hertz, and is preferably between about 800 and 1000 hertz.

said microphone for picking up the noise of fluid leaks in said pipe system, is mounted on the lower end of a support via insulating rings, thereby limiting the interference of sound and/or vibration origin;

said microphone is a miniature electret microphone, and the outside diameter of said guide of the microphone support is less than or equal to 30 mm, and for example less than or equal to 20 mm.

If the pick-up sensor is a microphone, said latter must be able to pick-up the fluctuations of sound pressure or noise coming from the leak and transmitted through the ground between the pipe system and the air pocket existing at the bottom of the bore or well and in the lower end of the waveguide. If the pick-up sensor is constituted by an accelerometer, said latter must be placed at the bottom of the well and pick up any vibrations coming from the leak and transmitted through the ground between the pipe system and the bottom of the well.

The invention provides a portable and self-contained system, which is very easy to use for detecting and locating with an accuracy of about 0.5 meter, any leaks occurring in underground pipe systems; the present invention is readily applicable for detecting leaks in pipe systems used for conveying fuel gas, such as for example the systems of pipes supplying cities with gas for heating buildings or dwellings.

Owing to its particular characteristics, the device according to the invention does not call for the need to use a source of acoustic signal provided in the liquid in one point of the pipe system.

By using a pick-up sensor situated for example at the bottom of a well made in the ground to this effect, and at a distance from the wall of the pipe which can vary between a few centimeters and a few meters, the invention makes it possible to measure noises or vibrations without any contact with the pipe.

The device according to the invention is very sensitive to the noises created by fluid leaks and enables an operator, wearing the headphones and carrying a portable signal processing case connected with the pick-up sensor located in supports sunk into the ground, to easily detect and distinguish the noise caused by said leak and transmitted through the ground to the pick-up sensor.

A particular advantage of the invention is that it enables the operator to distinguish a noise or a vibration caused by a leak of fluid flowing through a pipe system, from other noises or vibrations of underground or superficial origin, and more particularly from the noises or vibrations caused by underground electric cables, or those caused on the ground surface by motor-vehicles for example.

Moreover, the special electro-acoustic characteristics of the pick-up sensors installed inside a well of small diameter which can be readily formed in the ground, as well as the structure supporting the pick-up sensor, ensure a very good response to leak noises.

BRIEF DESCRIPTION OF THE DRAWINGS

The invention will be more readily understood on reading the following description of several embodiments, given by way of illustration and non-restrictively, with reference to the accompanying drawings, in which.

DETAILED DESCRIPTION OF PREFERRED EMBODIMENTS

Figure 1:
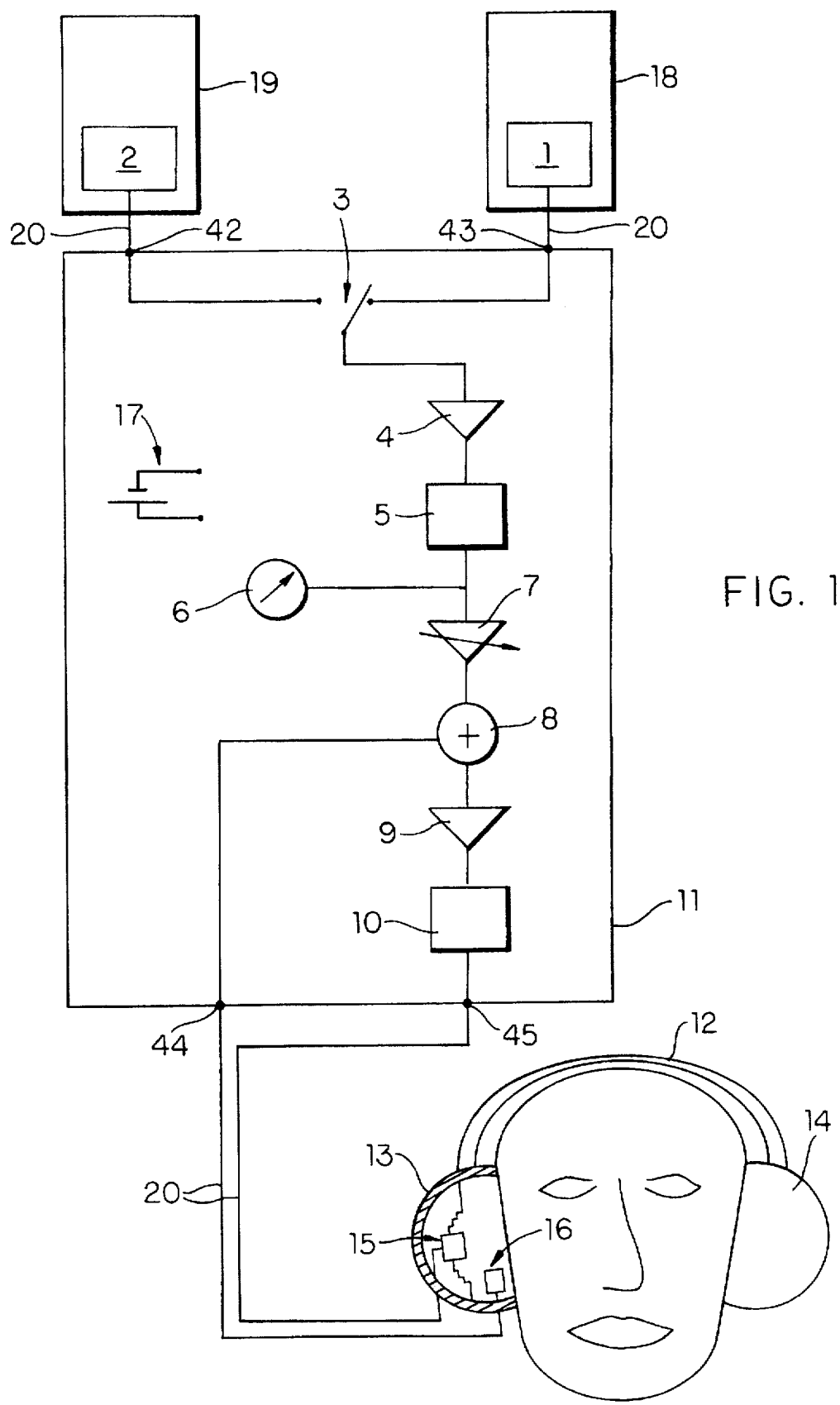
FIG. 1 shows diagrammatically the main components of a device according to the invention and their application method.
Figure 2:
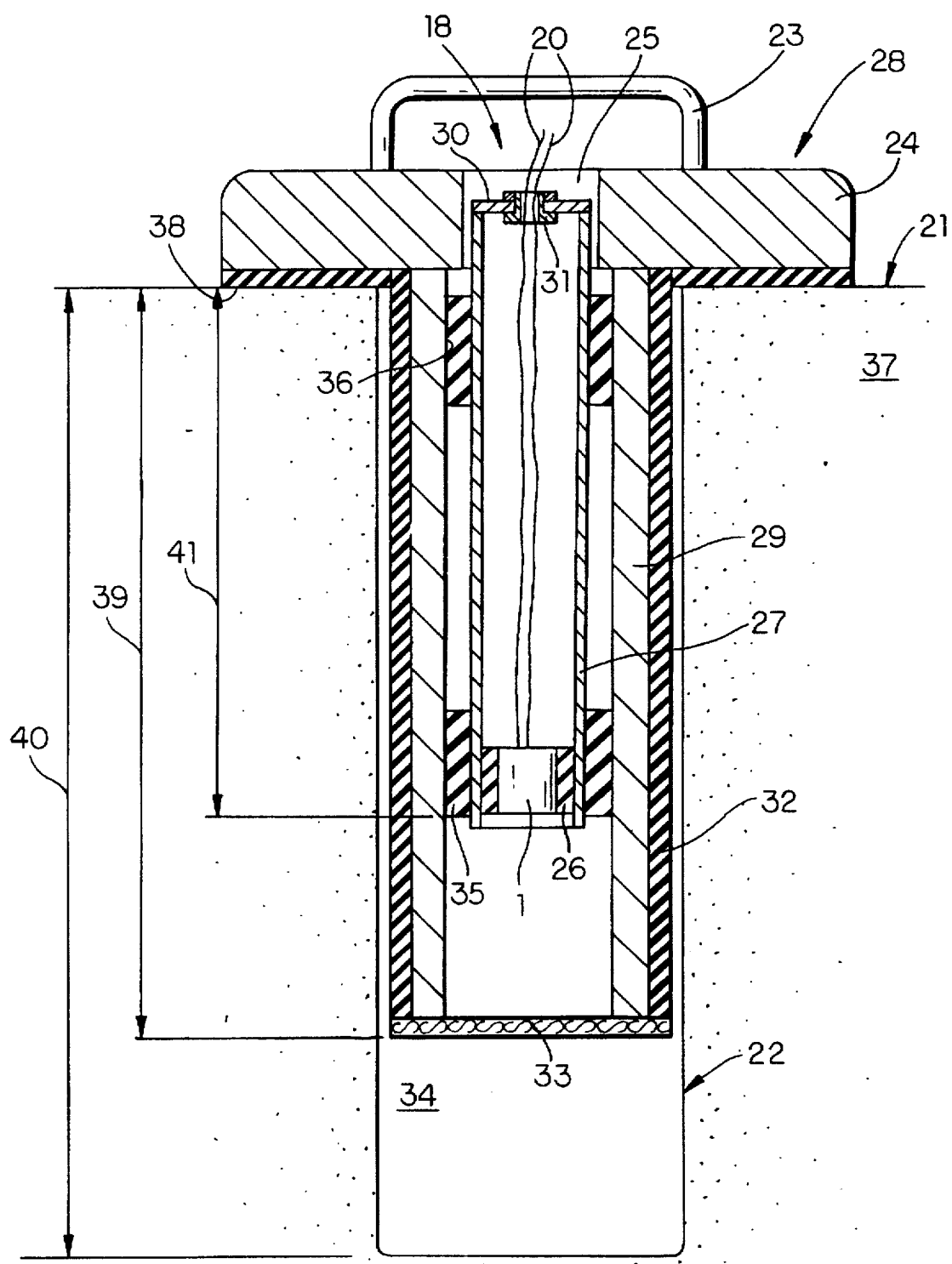
FIG. 2 is a cross-sectional view along a vertical plane of a preferred embodiment of a support for a microphone and its application to implementing the leak-locating device according to the invention.

Referring first to FIG. 1 this shows that the device comprises two pick-up sensors or microphones 1, 2 respectively mounted on supports 18, 19 illustrated in more details in FIG. 2.

The two microphones 1, 2 are connected via cables 20 to input terminals 42 and 43 provided on a case 11 containing the means for processing the signals delivered by the two microphones 1 and 2.

The signal processing case 11 is also connected to headphones essentially constituted by two shells 13, 14 which may be substantially semispherical, and whose wall is sound-insulated, which shells can be placed on the operator's head in such a way as to be in facing relationship with his ears, due to an arched band 12 interconnecting the two half-shells 13 and 14.

Each one of the shells 13 and 14 of the headphones comprises a speaker 15 and a microphone 16 placed close to the speaker 15 and to the ear of the operator wearing the headphones, said speakers 15 and microphones 16 being connected via cables 20, for the microphone 16 to an input terminal 44, and for the speaker 15, to an output terminal 45, which terminals 44, 45 are also provided on the case 11.

Said case 11 can be small-sized and provided with a strap in order to be carried and handled by the operator wearing the headphones.

To this effect, said case 11 comprises an internal source of electric power, such as a battery 17 which supplies said pick-up sensors 1 and 2, said headphones and also the different signal-processing circuits provided in the case.

As illustrated in FIG. 1, the signals delivered by the microphones 1 and 2, are conveyed to a selector switch 3, enabling the operator carrying the case 11, to connect at will, either one of the microphones 1 and 2 to the input of a preamplifier 4 for amplifying the signals delivered by said microphones 1 and 2.

The output of said preamplifier 4 is connected to the input of a high-pass or bandpass filter 5, whose low cut-off frequency is preferably between about 200 and 400 hertz and has an attenuation gradient below the relatively high cut-off frequency, thereby permitting the filtering of interference noises of very low frequency, which are not efficiently attenuated by the passive sound-insulation means provided in the pick-up sensor support.

The output of said filter 5 can be connected to a galvanometer 6 enabling the display of the average level of the signal delivered by either one of said microphones 1 and 2.

The signal delivered by said filter 5 is applied to the input of a variable-gain amplifier 7, enabling the operator to adjust the monitoring level of said signals delivered by the microphones 1 and 2.

The signal delivered by said amplifier 7 is delivered to the input of a summing device 8 which adds the signal delivered by said amplifier 7 to the signal delivered by the microphone 16 provided in the half-shell of said headphones.

The signal which is present at the output of the summing device 8 is applied at the input of an amplifier 9, followed by a filter 10 enabling a feedback signal to be generated, said feedback signal being delivered to the speaker 15 and enabling the reduction of ambient noises, thereby increasing the intelligibility of the signals delivered by the microphones 1 and 2 and facilitating recognition by the operator of leak noises and also enabling him, thanks to the selector switch 3, to detect, by successively switching one and then the other of said microphones 1 and 2, which one of them, 1 or 2, is closest to the leak point situated in the pipe system, simply by comparing the level of the noise heard by the operator.

The means for actively and electronically attenuating ambient noises, which means are essentially constituted by said amplifier 9 and said filter 10, are for example such as those described in patent U.S. Pat. No. 4,833,719 of the CENTRE NATIONAL DE LA RECHERCHE SCIENTIFIQUE (assignee of CARME & al.); in this case, the transfer function of the filter 10 is a complex polynomial function, and the product of the constant gain of the amplifier 9 by the module of the transfer function of the filter 10 and by the module of the open loop transfer function, measured between the input of the speaker 15 and the output of the microphone 16, is definitely higher than 1 throughout the range of sound frequencies to be attenuated, the feedback loop being stable for audible frequencies.

As an alternative illustrated in the diagram of FIG. 1, the signals delivered by the microphones 1 and 2 and preprocess by the means 4, 5, 7 described hereinabove, can be applied between the amplifier 9 and the filter 10 by a summing device provided to this effect.

If an accelerometer is used as pick-up sensor, the means for processing the signals delivered by the accelerometer can be identical or similar to those described with reference to FIG. 1 for processing the signals delivered by the microphones.

Referring now to FIG. 2, this shows that the support 18 for the microphone 1 picking up fluid leak noises from the buried pipe system, comprises a plunger robe 27 constituting a support for the microphone 1, which plunger tube can slide inside a guide 28 resting by its upper part on the surface 21 of the ground 37; the microphone 1 can thus be positioned and/or introduced into a well or bore 22 which is substantially cylindrical and drilled into the ground 37 to a depth 40 of about 50 cm for example.

Said microphone 1 is fixed subtantially on the lower end of said plunger tube 27, via a ring 26 encircling said microphone 1 and preferably produced from an elastomer material, which tube 27 may be made of metal.

The tube 27 is closed at its upper end by a plate 30 provided with a hole which may be central, and which is equipped with a packing or grommet 31 through which the wires or cables 20 can pass, for connecting the microphone 1 to the processing device illustrated in FIG. 1.

Said tube 27 forming support for the microphone 1 can slide inside said guide 28, due to rings 35 and 36, encircling substantially each one of the ends of said tube 27 and ensuring an attenuation of the vibrations and also preventing the propagation of noises from the outside into the inside of the cavity 34 which subsists at the lower part of the hole 22, when the whole device, such as illustrated in FIG. 2 is inserted in said hole.

The height or depth 41 of the microphone 1 in the well 22 can thus be adjusted by sliding the tube 27 inside a guide tube 29 forming pan of the guide 28.

The guide tube 29, which is for example in metal, is preferably surrounded by a sound-insulating sleeve 32, made for example from an elastomer material, the lower end of said guide tube 29 being further closed off by a plug 33 in acoustically transparent material, such as a fabric of synthetic fibers, this enabling said microphone 1 to be sensitive to acoustic waves propagating in the cavity 34 situated at the lower part of the well 22.

Said guide 28 preferably comprises a solid plate 24, for example in the shape of a thick disk, which can rest by its lower part on the periphery of the inlet to the well 22, on the surface 21 of the ground 37, preferably via a cushion 38 in a sound-insulating and/or shock- and vibration-damping material, such as for example elastomer.

Said thick disc 24 is preferably provided in its upper part with a handle 23 for easy manipulation of the whole device, said handle forming support for the microphone 1 which is shown in said FIG. 2.

As illustrated in said figure, said plunger tube 27 forming support for the microphone 1, can be slidably actuated by hand by the operator wearing the headphones and carrying the processing case shown in FIG. 1, thanks to an opening 25 provided in the center of the plate 24.

Preferably, the height 39 of said guide tube 29, as measured with respect to the lower face of the plate 24, is less by about 5 cm than the depth 40 of the well dug in the ground.

By way of example, said microphone 1 can be constituted by a reduced size electret microphone, showing little response to vibrations, and having a low intrinsic noise level and high sensitivity, such as about 0.1 to 0.2 volt/Pa, for example of the type sold by the company KNOWLES ELECTRONICS, INC., ITASCE, ILL. 60143, USA, under the reference Series EK.

Figure 3:
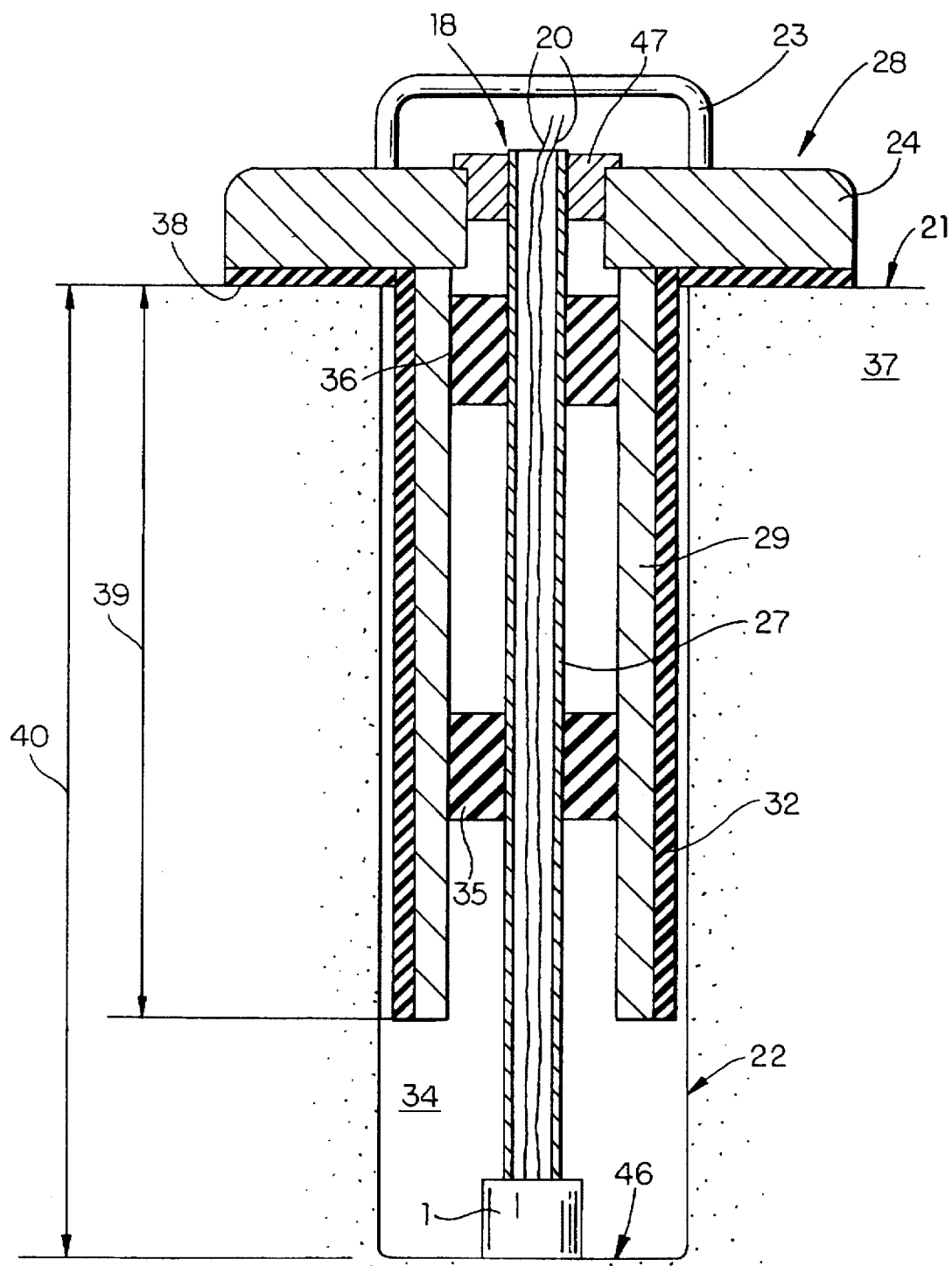
FIG. 3 is a cross-sectional view along a vertical plane of a variant embodiment of the support for the pick-up sensor when the latter is constituted by an accelerometer.

In FIG. 3, the pans which are functionally identical or similar to those of FIG. 2, have been given the same numeral references as in FIG. 2.

In the case illustrated in FIG. 3 where the sensor 1 is constituted by an accelerometer, said latter is laid or applied against a wall of the cavity 34, preferably against the bottom 46 of the well 22; said accelerometer is mounted on the end of the tube 27 forming support and through which pass the wires and cables 20 connecting the sensor to the case containing the signal processing means.

By comparison with FIG. 2, the shutter 33 has been eliminated, as well as the ring 26 and, if appropriate, the disk 30 and the grommet 31.

A plug 47 in elastomer material closes off the orifice, which bears the reference 25 in FIG. 2, which orifice is provided in the disk 24 and surrounds the upper end of the tube 27.

Figure 4:
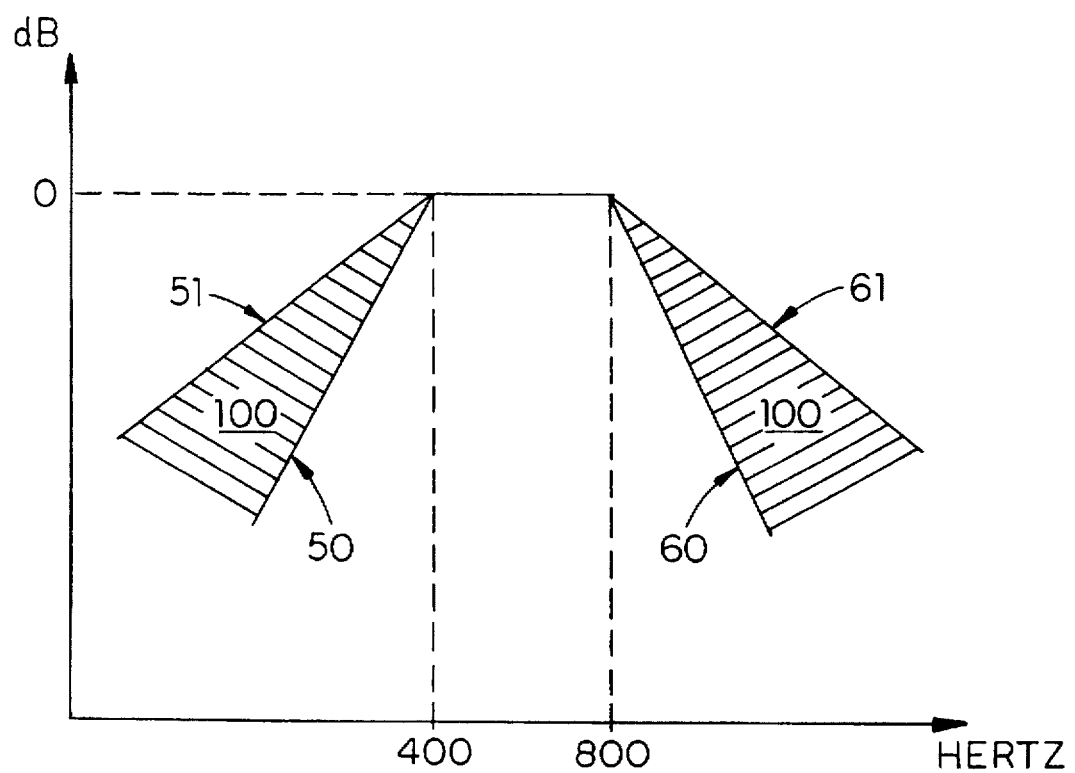
FIG. 4 shows diagrammatically the module of the transfer function according to a preferred embodiment of a filter included in the composition of the means for processing the signals delivered by the pick-up sensor.

Referring now to FIG. 4, this shows that the X-axis represents the frequency, and the Y-axis represents the gain in decibels.

According to a preferred embodiment of the invention, the graphic representation in said figure of the module of the transfer function, i.e. of the gain of said filter, referenced 5 in FIG. 1, and which is a bandpass filter, is situated inside the hatched zones 100 which are defined by segments of line 50, 51, 60, 61.

As illustrated in said figure, the gain is substantially nil in the range of frequency of 400 hertz to 800 hertz, the references 50 and 51 corresponding respectively to a gradient of attenuation of the filter at the low frequencies of 24, respectively 6, decibels per octave.

References 60 and 61 correspond respectively to an attenuation gradient of the filter at the high frequencies of 24, respectively 6, decibels per octave.

What is claimed is:

1. A device for detecting and locating a leak of fluid from a pipe system buried in the ground, said device comprising:

pick-up sensor means not in contact with a pipe system buried in the ground for providing first signals in response to a leak of fluid from said pipe system;

signal-processing means for processing said first signals into processed signals; and headphone means equipped with at least one speaker supplied with said processed signals for detecting and locating said leak, wherein said headphone means further comprises microphone means for sending microphone signals to said signal-processing means, and said signal-processing means further comprises electronic noise-reducing means responsive to said microphone signals for reducing noise in said processed signals, and wherein said pick-up sensor means is mounted on an end of support means for sliding inside a guide surrounded by an insulating sleeve.

2. The device as claimed in claim 1, wherein said headphone means comprises two sound-insulated shells, said at least one speaker comprises speakers respectively in said shells, and said microphone means comprises microphones respectively in said shells, said microphones being connected to said signal-processing means and wherein said support means is for sinking into a well in said ground.

3. The device as claimed in claim 1, and further comprising insulation means for insulating said pick-up sensor means against sounds and vibrations from said support means, whereby to facilitate distinguishing a noise or a vibration caused by said leak of fluid from other noises or vibrations of underground or surface origin.

4. The device as claimed in claim 1, wherein said pick-up sensor means comprises a pick-up microphone and said support means are for positioning said pick-up microphone inside a well in said ground at a depth varying between $10^{-1}$ meter and 1 meter, and said sliding is for varying said depth.

5. The device as claimed in claim 1, wherein said pick-up sensor and support means comprise two pick-up sensors respectively fixed to two tubular supports for respective wells in said ground, and wherein said signal-processing means comprises a selector switch for respectively transmitting said first signals of said two pick-up sensors through said signal-processing means.

6. The device as claimed in claim 1, and further comprising:

a portable case, wherein said signal-processing means is inside said portable case and comprises a preamplifier for the first signals provided by said pick-up sensor means, and a high-pass or bandpass filter for filtering corresponding signals from said preamplifier.

7. The device as claimed in claim 1, wherein said pick-up sensor means comprises a pick-up microphone and said support means comprises insulating rings for said sliding.

8. The device as claimed in claim 1, wherein said pick-up sensor means comprises a pick-up microphone and said guide has an acoustically transparent shutter at one end.

9. The device as claimed in claim 1, wherein said signal-processing means comprises a high-pass or bandpass filter having a low cut-off frequency higher than 100 Hertz and a high cut-off frequency lower than 2000 Hertz.

10. A device for detecting and locating a leak of fluid from a pipe system buried in the ground, the device comprising:

pick-up sensor means not in contact with a pipe system buried in the ground for picking up noise caused by a leak of a fluid from said pipe system;

signal-processing means for processing said first signals into processed signals; and headphone means with at least one speaker supplied with said processed signals for detecting and locating said leak, wherein said headphone means further comprises microphone means for sending microphone signals to said signal-processing means, and said signal-processing means further comprises electronic noise-reducing means responsive to said microphone signals for reducing noise in said processed signals, wherein said pick-up sensor means is mounted on an end of support means for sinking into a well in said ground, and wherein said support means is further for sliding inside a guide surrounded by an insulating sleeve.

11. The device as claimed in claim 10, wherein said pick-up sensor and support means comprise two pick-up sensors respectively fixed to two tubular supports for respective wells in said ground, and wherein said signal-processing means comprises a selector switch for respectively transmitting said first signals of said two pick-up sensors through said signal-processing means.

12. The device as claimed in claim 10, wherein said pick-up sensor means comprises a pick-up microphone and said guide has an acoustically transparent shutter at one end, and wherein said signal-processing means comprise a high-pass or bandpass filter having a low cut-off frequency higher than 100 Hertz and a high cut-off frequency lower than 2000 Hertz.

* * * * *

UNITED STATES PATENT AND TRADEMARK OFFICE
CERTIFICATE OF CORRECTION

PATENT NO. : 5,744,700
DATED : April 28, 1998
INVENTOR(S) : Christian CARME, et al.

It is certified that error appears in the above-indentified patent and that said Letters Patent is hereby corrected as shown below:

On the title page insert -- [30] Foreign Application Priority Data Sept. 20, 1994 [FR] France FR94/11539 --.

Signed and Sealed this

Twenty-ninth Day of December, 1998

Attest:

BRUCE LEHMAN

Attesting Officer    Commissioner of Patents and Trademarks